United States Patent [19]
Conkling et al.

[11] 3,931,737
[45] Jan. 13, 1976

[54] PULSATING LIQUID FLOW TRANSMITTER

[75] Inventors: William Collins Conkling, Essex Fells; Joseph Thomas Weber, Jr., Clark, both of N.J.

[73] Assignee: Pennwalt Corporation, Philadelphia, Pa.

[22] Filed: July 12, 1974

[21] Appl. No.: 488,098

[52] U.S. Cl. .................................. 73/209; 340/199
[51] Int. Cl.² ............................................ G01F 1/24
[58] Field of Search ....... 73/209, 210, 207; 340/199

[56] References Cited
UNITED STATES PATENTS

| | | | |
|---|---|---|---|
| 3,284,786 | 11/1966 | Harris | 73/209 |
| 3,455,161 | 7/1969 | Randall | 73/207 |
| 3,522,731 | 8/1970 | Wilson | 73/209 |
| 3,701,136 | 10/1972 | Stevens et al. | 340/199 |

FOREIGN PATENTS OR APPLICATIONS

| | | | |
|---|---|---|---|
| 828,920 | 11/1937 | France | 73/209 |
| 72,713 | 7/1951 | Denmark | 73/209 |

OTHER PUBLICATIONS
Boylestad, R. and L. Nashelsky, Electronic Devices and Circuit Theory, Prentice Hall, Inc., N.J., 1972, p. 696.

*Primary Examiner*—Richard C. Queisser
*Assistant Examiner*—Marcus S. Rasco
*Attorney, Agent, or Firm*—Charles N. Quinn

[57] ABSTRACT

A flow transmitter for monitoring pulsating liquid flow rates, such as intermittent or cyclic impulsion produced by reciprocating pumps, employs a short stroke, variable area flowmeter having an armature core mounted in the flowmeter stem. As the stem rises and falls with flow, the armature moves within a linear variable differential transformer coil to produce an A. C. voltage following core deflection. This A. C. deflection signal is converted to a milliampere D. C. signal by means of a demodulator which through a long-time constant RC filter network averages the pulsed flow variations to provide a continuous non-inferential measurement proportional to flow.

11 Claims, 9 Drawing Figures

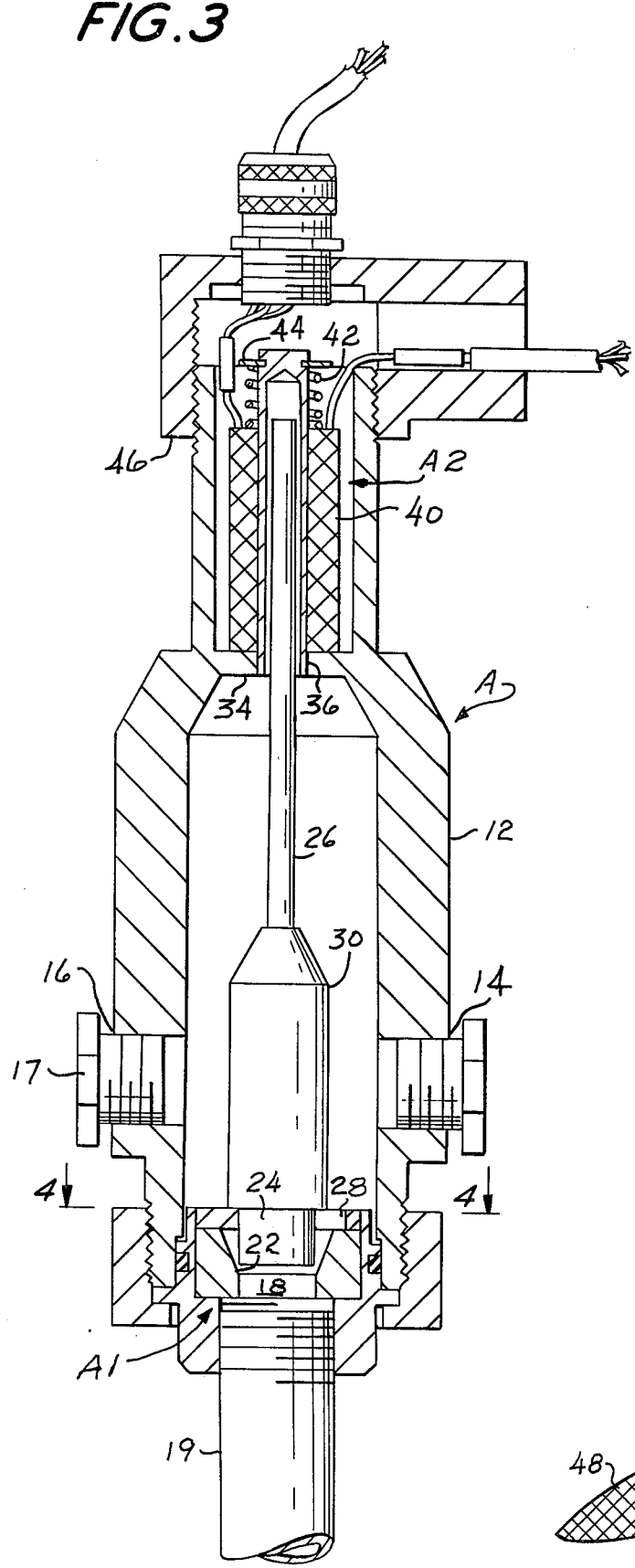
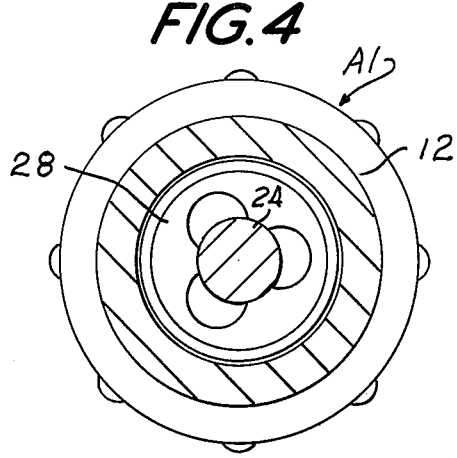
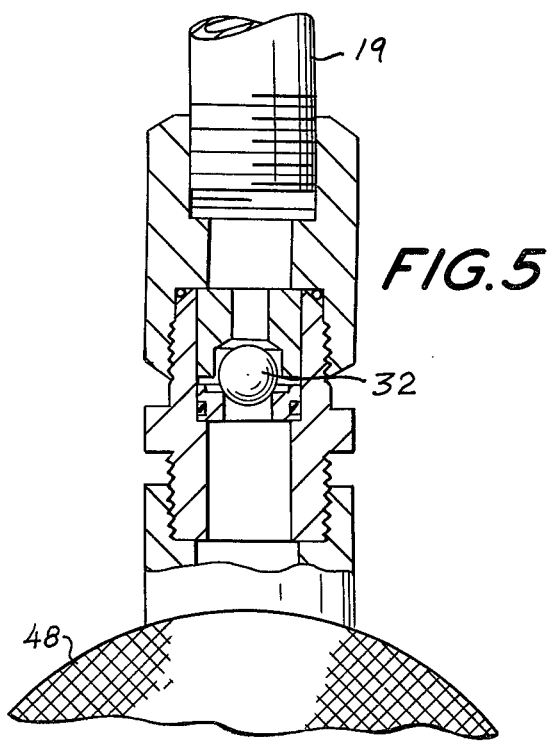

PULSATING LIQUID FLOW TRANSMITTER

This invention relates to flow transmitters which convert liquid flow rates into an electrical signal proportional to the rate of flow. More particularly this invention relates to a metering pump throughput transmitter for sensing pulsed liquid flows, such as cyclic or intermettent pulsations effected by reciprocating pumps, and delivering an electrical output signal to an indicator, recorder or controller as a continuous non-inferential measurement of actual flow.

As is well known, simple diaphragm, plunger and reciprocating pumps force liquid through interconnecting piping on an intermittent or discontinuous basis. That is, the pulsating liquid flow produced by the pump's reciprocatory action is zero approximately 50 percent of the time and then during the remaining fifty percent of a complete stroking cycle typically varies in velocity as a half cycle of a sine wave. The maximum flow is characteristically three or four times the average flow, such condition existing in both the suction and discharge lines although on an alternating basis. Pumps with two or more heads produce a smoother flow but still a very uneven resultant effect. Accumulators, which moderate the pulsations and even out flow to some extent, add cost and other complications to pumping systems.

The present invention is a throughput transmitter which provides an electrical output signal that is directly proportional to liquid flow rate regardless of its intermittent, cyclic or pulsating nature. The sensing system comprises a variable area flowmeter having a housing which is coupled to the liquid line and includes a conical inlet orifice, constituting a tapered seat, and a stem with a cylindrical plug or float at the bottom. The weight of the stem along with the orifice diameter and taper determine capacity. The position of the stem as it is displaced by the liquid flow is detected by a linear variable differential transformer (LVDT) whose core is an armature at the top of the stem. The LVDT primary is powered by a closely regulated oscillator. As the stem moves up and down with the pump actuating stroke, the core rises and falls within the transformer windings to produce an AC voltage. which is continuously and instantaneously proportional to flow rate. The AC output voltage from the LVDT is sensed by a demodulator which includes an AC amplifier stage and a rectifier stage for converting the AC signals into a pulsed D.C. output. An RC filter network with a large-time constant (5 to 10 times larger than the slowest pulse rate) electronically averages the flow variations caused by the reciprocating action of the pump, whereupon the deflection signal is converted to a flow-proportional milliampere signal that can be transmitted to an indicator, recorder or controller as a continuous non-inferential measurement of actual flow through the pump.

It is therefore an object of this invention to provide a flow transmitter developing a D.C. output signal which is a continuous noninferential measurement of actual flow through a metering pump.

Another object of this invention is to provide a flow transmitter which will deliver a milliampere DC output signal proportional to liquid flow rate.

Still another object of this invention is to provide a throughput transmitter which is especially adapted to handle intermittent pulsating and cyclic flow rates effected by reciprocating pumps.

Yet another object of this invention is to provide a flow transmitter for use in water or waste treatment, chemical processing, refining or in any liquid process employing a metering pump output.

Yet still another object of this invention is to provide a flow transmitter which delivers a flow-proportional signal for indicating, recording, controlling, totalizing, monitoring and for closed loop control in continuous proportioning or blending.

A further object of this invention is to provide a flow transmitter which will monitor pump performance and give a direct indication of trouble, such as valve failure or fall-off in pump efficiency.

Yet a further object of this invention is to provide a flow transmitter which will give a direct indication of actual delivery each time the feed rate is changed.

Other objects of this invention are to provide an improved device of the character described which is easily and economically produced, sturdy in construction and highly efficient in operation.

With the above and related objects in view, this invention consists of the details of construction and combination of parts as will be more fully understood from the following detailed description when read in conjunction with the accompanying drawing in which:

FIG. 3 is a side sectional view thereof to show a variable area flowmeter coupled to an electronic sensor embodied in the instant invention.

FIG. 4 is a sectional view taken along lines 4—4 of FIG. 3.

FIG. 5 is a sectional view taken along lines 5—5 of FIG. 2.

Figure 1:
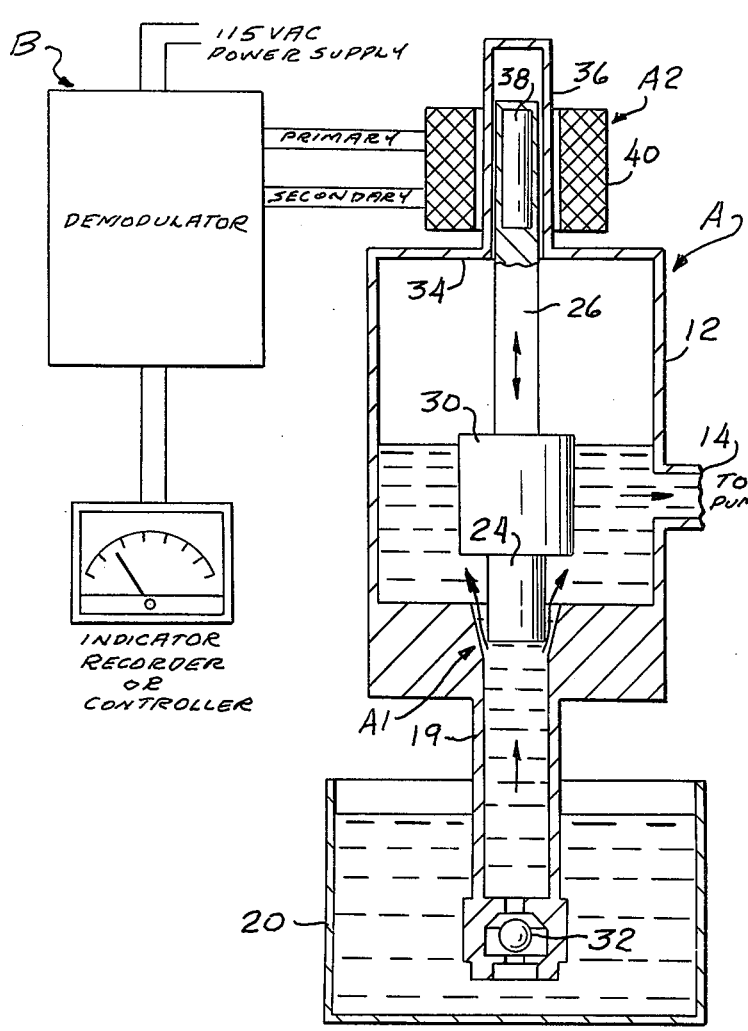
FIG. 1 is a diagramatic view of a flow transmitter embodying this invention.
Figure 2:
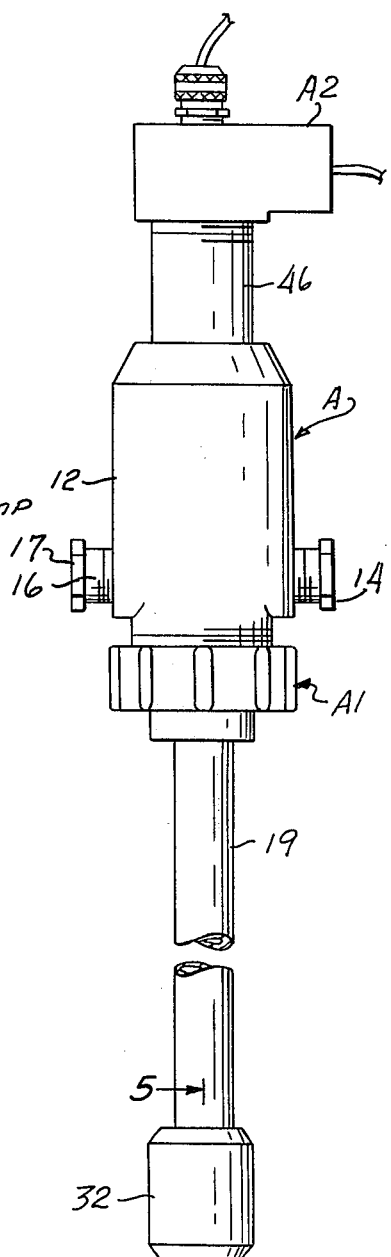
FIG. 2 is a side elevational view of the flow transmitter.

Referring now in greater detail to the drawings in which similar reference characters refer to similar parts, we show a pulsating liquid flow transmitter embodying the present invention. The flow transmitter comprises a sensor, generally designated as A, which includes a variable area flow meter A1 whose position is detected by a linear variable differential transformer A2, and an electronic demodulator circuit, generally designated as B which converts the A.C. output from the sensor into a D.C. milliampere signal proportional to actual liquid flow.

The sensor A consists of a housing 12 having ports 14 and 16 adapted to be coupled to single head or dual head pumps (not shown), such as conventional reciprocating diaphragm metering pumps. For purposes of simplicity, port 16 is illustrated as being closed by a stopper 17 such that only the discharge port 14 is connected to the suction side of the reciprocating pump.

However, it is understood that port 16 could just as well be connected to a pump alone or in combination with port 14. An inlet 18 at the bottom of the housing 12 is connected to piping conduit 19 or leg leading to a liquid supply container or tank 20.

The variable area flowmeter A1 includes a conically-tapered tubular portion 22 adjacent the inlet 18 at the bottom of housing 12. Within the conically-tapered portion 22 is carried a cylindrical plug or float 24 which moves up and down in response to liquid flow. A stem 26 extends upwardly from the float plug 24 and thereafter into the chamber of housing 12. A guide 28 has a cloverleaf-shaped opening disposed about a bore in which the plug 26 axially slides. A large cylindrical member 30 concentric with the stem 26 is adapted to rest upon the guide 28 when there is no positive liquid flow through the housing such that a clearance always exists between the tapered seat portion 22 and the lower periphery of the float 24 to preclude wedging of said float plug.

Because of the clearance between the float 24 and the tapered tubular orifice 22, backflow can occur when the float is in its lowermost position at rest. In order to prevent such backflow (which cannot be averaged with forward flow through the sensor A), a check valve 32 is incorporated within the inlet line 19. That is, due to the momentum of the column of water in the inlet line 19, an overpressure is produced in the line between the sensor A and the pump when the latter ceases to induct liquid. Such overpressure within the housing chamber tends to be relieved through the clearance of the variable area flowmeter A1 back to the supply tank 20 if a check valve is not included to prevent the backflow. Therefore, without such an upstream check valve 32 (or similar means to prevent backflow), some of the net flow would be sensed twice and result in incorrect averaging with consequent errors in flow measurement.

At the upper portion of the housing 12 is a ceiling 34 which acts as a barrier to prevent liquid from coming into contact with the electrical elements of the linear differential transformer A2. Press fit within a central aperature in the ceiling 34 and upwardly extending therefrom is a tubular member 36. The upper portion of the stem 26 is slidably engaged by the bore of tubular member 36 which acts as an upper guide for the stem. A soft iron armature 38 is inserted with a recess at the top of stem 26 and functions as a core for the linear differential transformer A2. The primary and secondary windings for the linear differential transformer are contained within a generally doughnut-shaped case 40 which is inserted about the tubular member 36 and rests on the upper surface of ceiling 34. A helical spring 42 compressed between the upper cylindrical wall of the case 40 and a pin 44 transversely extending through the top of tubular member 36 resiliently retains the case 40, and hence its windings, against a predetermined reference position. A cap 46 threadedly engaging screws at the top of the housing 12 encapsulates the casing 40 so that only the leads to the primary and secondary coil windings project therethrough.

Figure 7:
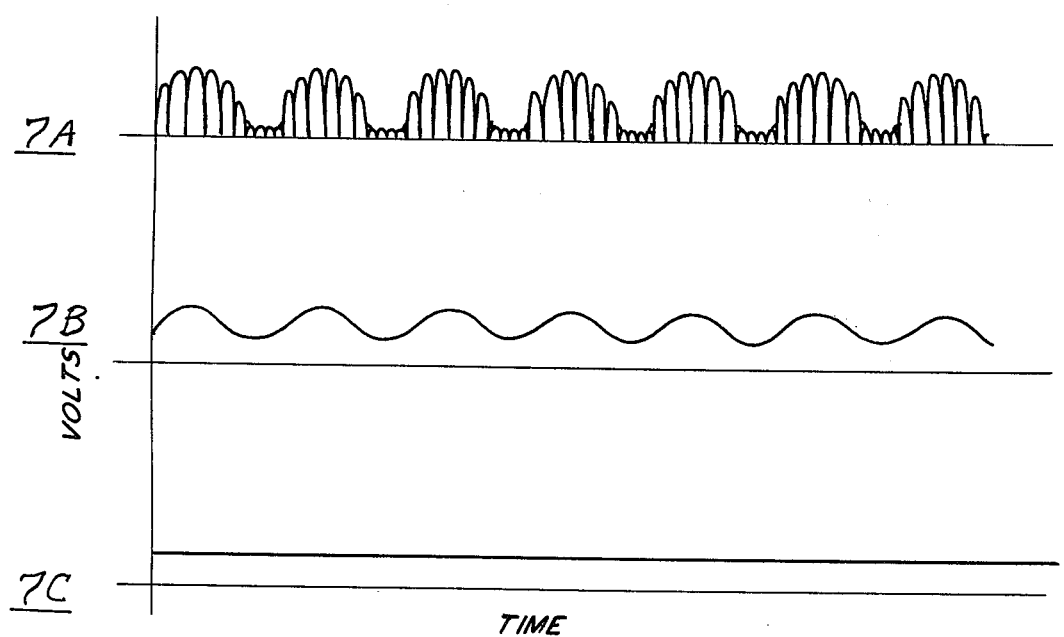
FIG. 7 is a graphical representation of the wave forms appearing respectively at the output of the A.C. amplifier, rectifier and filter sections of the electronic demodulator.
Figure 8:
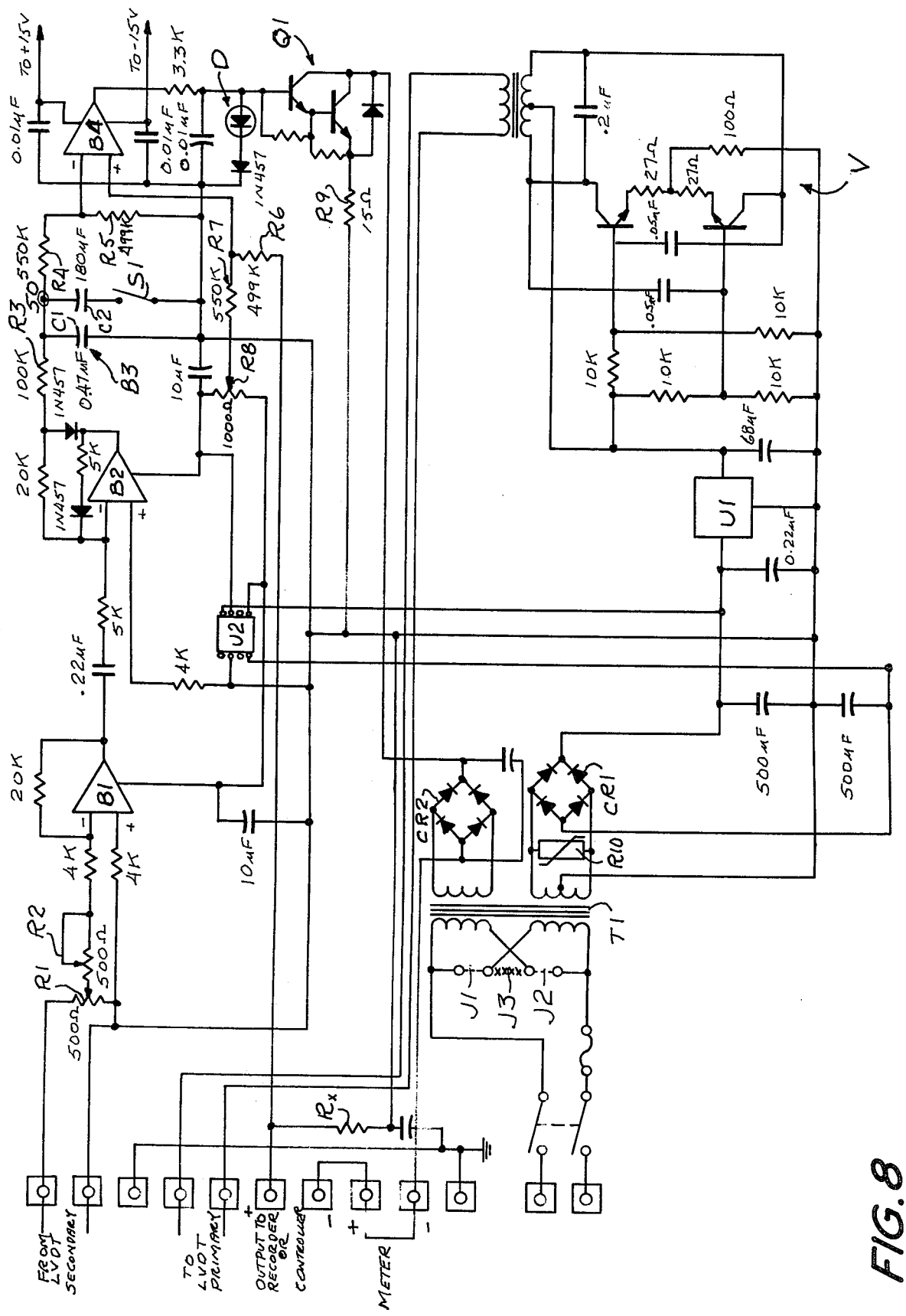
FIG. 8 is a wiring diagram of the electronic circuitry embodied in the flow transmitter.

The primary of the linear differential transformer A2 is coupled to an oscillator V which, as shown in FIG. 8, constitutes a free running multivibrator having an output frequency of 1,800 cycles per second. The output of the linear variable differential transformer A2 is an A.C. voltage which varies from zero, when the armature 38 is centered with respect to the secondary coils, to a predetermined value proportional to the displacement of the armature from center. The position-detected A.C. output voltage from the transformer secondary is applied to the input of an A.C. operational amplifier by way of a coarse span adjust potentiometer R1 and fine adjust potentiometer R2 in series therewith. The output wave form from the operational amplifier B1 is shown in FIG. 7A. This amplified A.C. voltage is applied to the input of operational amplifier and rectifier circuit B2. The output of the rectifier B2 is applied to an RC filter network B3 comprising 100K resistor R3, 0.47 microfarad capacitor C1 and 180 microfarad capacitor C2, the latter being incorporated into the filter network when switch S1 is closed. Switch S1 is included to permit, when open, zero adjustment of the armature 38 with respect to coil windings 40 without requiring the operator to wait up to 50 seconds to pick up the rectified signal voltage at test point 50. That is, with switch S1 closed, the time constant of the RC filter network B3 is from 5 to 10 times larger than the period of the slowest pulse rate through the sensor A. The wave form at test point 50, with the switch S1 open, is shown in FIG. 7B while the wave form under normal operation with switch S1 closed is shown in FIG. 7C.

The pulsed D.C. output from the filter network B3 is passed to a D.C. amplifier B4 by way of a high impedance resistor R4. The high impedance of resistor R4 (550K) prevents the filter network B3 from being loaded down by the D.C. amplifier B4. The ratio of resistor R4 to resistor R5 (449K) sets the gain (nominally 1) to the negative input terminal of D.C. amplifier B4. Resistor R6 (449K) samples the feedback across range resistor $R_x$ and passes this feedback to the positive input terminal of D.C. amplifier B4, the ratio of R7 (550K) to R6 being identical to that of R4 to R5 and setting the gain of nominally 1 to the positive feedback terminal of said amplifier B4. Hence, the D.C. amplifier B4 serves as an error detector in a D.c. feedback circuit.

Potentiometer R8 functions as a zero adjust wherein typically 4 mA flow is a minimum for establishing a live zero for process control. The range resistor $R_x$ is incorporated to suit customer requirements, such range resistor being 100 ohms for a 1 to 5 milliampere range, 25 ohms for a 4 to 20 milliampere range, and 10 ohms for a 10 to 50 milliampere range.

The error between the current through resistor R4 and the feedback from the output circuit gives a proportional voltage which is delivered to a Darlington pair Q1 and resistor R9 which function as a conventional voltage-to-current converter B5 that regulates output signal current proportional to flow. A light emitting diode D in series with an IN457 or other conventional diode at the base of the Darlington pair serves to limit the Darlington voltage and thereby the output current so as to prevent the output signal from exceeding 65 milliamperes, which is the maximum load for the instrumentation.

Regulator U1 furnishes a +12 volt D.C. regulated supply from the secondary of the power supply transformer T1 through a full wave bridge rectifier CR1 for the oscillator V. Regulator U2 furnishes a ±15 volt regulated supply from bridge rectifier CR2 for the A.C. amplifier B1, the rectifier B2, the zero offset potentiometer R8 and the D.C. amplifier B4. Jumpers J1 and J2 in the primary of the transformer T1 are used in connection with a 115 VAC operation while Jumper J3 is employed when the supply is 230 VAC. A varistor R10 in transformer T1 secondary breaks down at higher than normal voltages to prevent power surges from damaging components.

As is apparent from the foregoing description, the instant invention utilizes the combination of electrical and hydraulic design to establish a metering transmitting system for pulsed flow at rates as low as 12 strokes per minute. The LVDT armature 38 which rises and falls with the float 24 in variable tapered tube 22 is detected by the secondary of the linear variable differential transformer. The stroke of the variable area meter A1 is quite short (nominally 0.25 inch total stroke) and can be made sufficiently small and light to respond to low flow rates, for example, 0.01 gpm average. The clover disk 28 enables the stem of the float 24 to be readily guided. The housing 12 provides an air volume at its top to contribute to smoothing of the liquid flow through the sensor A. The check valve 32 in combination with the clearance for the float 24 at rest results in an average float position that is proportional to widely varying cyclic flows over 10:1 flow ranges. A strainer 48 at the bottom of the inlet leg 19 prevents foreign particles from clogging the check valve 32 or the variable area flowmeter A1 itself.

The LVDT armature and stem has a mass and velocity profile such that its position in the flow is continuously and instantaneously proportional to flow rate. The A.C. amplifier B1 and the active rectifier stage are designed with adequate dynamic range whereby the pulsed float positions are faithfully transferred with their relative magnitudes intact upon entering the RC filter network B3. The RC filter network B3 has a time constant which is 5 to 10 times larger than the period of the slowest pulse rates in contradistinction to conventional LVDT demodulators which are designed to filter out only LVDT excitation frequencies.

Figure 9:
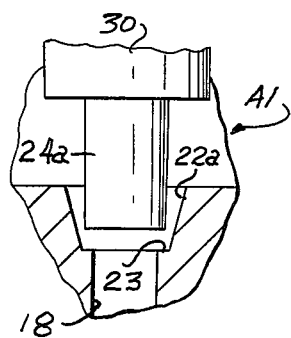
FIG. 9 is a fragmentary sectional view of a modified form of the variable area flowmeter.
Figure 6:
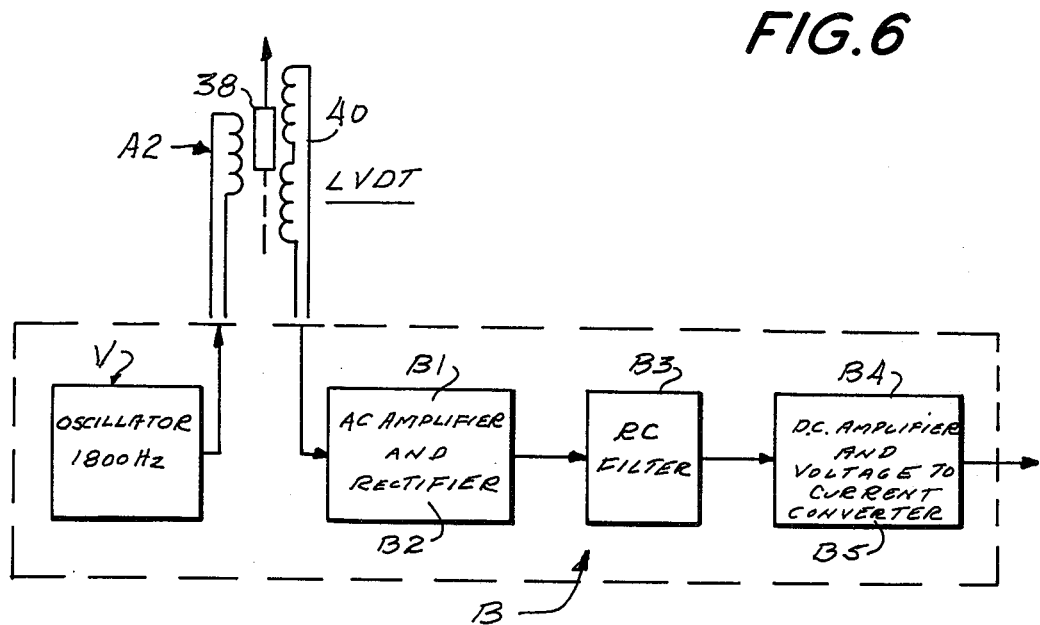
FIG. 6 is simplified block diagram representation showing the electrical sensing elements in combination with an electronic demodulator section embodied in the present invention.

In FIG. 9, there is shown a modification of the check valve configuration wherein a tapered orifice 22a at the bottom of the housing 12 includes an annular seat 23. At rest position, the float 24a lays on the annular seat 23 and seals off the backward flow through the orifice.

Although this invention has been described in considerable detail, such description is intended as being illustrative rather than limiting since the invention may be variously embodied without departing from the spirit thereof, and the scope of the invention is to be determined as claimed.

What is claimed is:

1. A pulsating liquid flow transmitter comprising:
   a. a housing for coupling to a line through which liquid is pumped, said housing including a tapered tubular orifice therein and a float axially displaceable in said tapered orifice in response to the rate of flow of liquid therethrough;
   b. sensing means for monitoring the displacement of said float and electrically delivering an A.C. output signal proportional to the displacement, said sensing means comprising a linear variable differential transformer having an armature moveable with said float and having a primary winding thereof coupled to an oscillator;
   c. means for demodulating said A.C. output signal and having a D.C. milliampere output which can be transmitted as a continuous non-inferential measurement proportional to flow, said means for demodulating said A.C. output signal further comprising:
      i. an A.C. amplifier;
      ii. a rectifier for providing a pulsed D.C. output;
      iii. a large time constant RC network for averaging out the pulsed response; and
      iv. a voltage to current converter including a Darlington circuit and a current sensing resistor; and
   d. a light emitting diode in the base of said Darlington circuit for simultaneously preventing the output signal from exceeding the flow proportional capacity of any chosen output loop instrumentation and providing local indication of overload conditions from light emitted by the diode;
wherein said current sensing resistor is an emitter resistor.

2. A metering pump throughput transmitter for sensing pulsed liquid flows and delivering an electrical output signal as a continuous non-inferential measurement of actual flow, comprising:
   a. a variable area flowmeter, said variable area flow meter further comprising:
      i. a housing;
      ii. a conical inlet orifice in said housing having a tapered seat for the support of a float during a zero flow condition;
      iii. a float of generally cylindrical configuration, said float cylindrical configuration having the general configuration of two abutting coaxial cylinders, an upper cylinder having a diameter larger than the lower cylinder said float being suitably disposed for vertical movement in said housing in response to liquid flow through said housing;
      iv. a stem of generally rod-like configuration, having attached thereto, at its lower end, said upper cylinder of said float, said attachment being in such a manner that said two abutting coaxial cylinders are coaxial with an axis of rotation of said stem, said stem having a soft iron insert therein at an upper extremity thereof;
      v. a hollow tubular member extending upwards from a top surface or ceiling of said housing, said hollow tubular member having the hole therein coincidental with a central aperture in said top surface of said housing;
   b. linear differential transformer primary and secondary windings contained in a generally doughnut-shaped case surrounding said tubular member and being supported on an upper surface of said housing;
   c. a free running, multivibrater oscillator having an output frequency of 1,800 hertz;
   d. a first A.C. operational amplifier;
   e. a second A.C. operational amplifier;
   f. a rectifier circuit;
   g. an RC filter network;
   h. a high impedance resistor;
   j. a D.C. amplifier;
   k. a D.C. feedback circuit;
   l. a pair of transistors arranged in Darlington pair configuration with one another;
   m. diode means connected to the base of said first transistor of said pair of transistors arranged in Darlington pair configuration, said diode means comprising a light emitting diode in series with a conventional diode;
   n. a range resistor;
   o. a power supply transformer for transforming an input line voltage to an appropriate voltage for said Darlington pair and said range resistor; wherein said stem extends upwards away from said float and has a constant diameter, said stem extending through a central aperature in a ceiling of said housing and further extending upward within said hollow cylindrical tubular member which also extends upward from said central aperture the inner diameter of said tubular member being slightly larger than the outer diameter of said stem such that there is no contact therebetween and a portion of said stem extending into said tubular member can move freely within said tubular member, along the length thereof in response to movement of said float; wherein the output of said free running multivibrator oscillator is connected to the primary windings; wherein said primary and secondary windings together with said soft iron insert in said stem together comprise a linear differential transformer; wherein the output of said first A.C. operational amplifier is connected to the input of said second A.C. operational amplifier; wherein the input to said rectifier circuit is the output from said second A.C. operational amplifier; wherein the output of said rectifier circuit is connected to the input of said RC filter circuit; wherein the output of said RC filter circuit is connected through said high impedance resistor to the input of said D.C. amplifier; wherein said D.C. feedback circuit samples a voltage across said range resistor with respect to ground and feeds a portion thereof back as an input to said D.C. amplifier; wherein said output of said D.C. amplifier is also connected as input to the base of a first one of said transistor connected in said Darlington pair configuration; wherein said diode means is connected to allow current to pass from the base of said first transistor of said pair of transistors arranged in Darlington pair configuration to a regulated power supply; wherein an output from an emitter of said Darlington pair is connected to a common or ground point of said circuit; wherein an output from a collector of said Darlington pair is connected to a portion of a secondary winding of said power supply transformer; wherein said range resistor is connected between a second portion of a secondary winding of said power supply transformer and an input to said D.C. amplifier thereby comprising a portion of said D.C. feedback circuit.

3. The metering pump throughput transmitter for sensing pulsed liquid flows and delivering an electrical output signal as a continuous non-inferential measurement of actual flow, of claim 2, further comprising:
   a. a switch and a capacitor both connected in series with the capacitor of said RC filter network, to optionally, selectably allow changes in the time constant of said RC filter network by an operator opening or closing said switch.

4. The metering pump throughput transmitter for sensing pulsed liquid flows and delivering an electrical output signal as a continuous non-inferential measurement of actual flow, of claim 3, further comprising:
   a. jumper switches located in the primary windings of said power supply transformer to optionally selectably permit the transformer and hence the metering pump throughput transmitter to be used with an input power supply of 115 volts or 230 volts.

5. The metering pump throughput transmitter for sensing pulsed liquid flows and delivering an electrical output signal as a continuous noninferential measurement of actual flow, of claim 4, further comprising:
   a. potentiometer means for zero adjustment of an output voltage measured across said range resistor; wherein said potentiometer means outputs are connected as power supply inputs to said first and second A.C. amplifiers and said input to said potentiometer means is connected to said output of said diode means.

6. The metering pump throughput transmitter for sensing pulsed liquid flows and delivering an electrical output signal as a continuous noninferential measurement of actual flow, of claim 5, wherein said conical inlet orifice of said transmitter has a first, cylindrical portion through which incoming flow first must pass, has a second, conical portion having the general configuration of a truncated cone through which flow must then pass and has a third, cloverleaf-shaped guide portion with a bore in the center thereof in which the bottom, smaller cylindrical portion of said float can slide vertically up and down, said cloverleaf-shaped guide being of such a size with respect to said upper, larger cylindrical portion of said float that said upper, larger cylindrical portion of said float cannot pass therethrough but can rest thereon, said diameter of said upper, larger cylindrical portion of said float being smaller than a circle which, if drawn, would have a center coincidental with the center of said cloverleaf-shaped guide and with the axes of rotation of said two cylindrical portions of said float, and would be tangent to the outer extremities of the three "leaves" of the cloverleaf-shaped guide, whereby a small amount of flow can pass through said cloverleafshaped guide when said upper cylindrical portion of said float is resting thereon, and wherein when said upper, large cylindrical portion of said float is resting on said cloverleaf-shaped guide, said lower, smaller cylindrical portion of said float extends downward into said second, conical shaped portion of said inlet orifice but does not contact the walls thereof.

7. The metering pump throughput transmitter for sensing pulsed liquid flows and delivering an electrical output signal as a continuous noninferential measurement of actual flow, of claim 6, wherein said lower, smaller cylindrical portion is of sufficiently short length that it does not extend downwards into said first, cylindrical portion of said inlet orifice of said transmitter when said upper, large cylindrical portion of said float is resting on said cloverleaf-shaped guide.

8. The metering pump throughput transmitter for sensing pulsed liquid flows and delivering an electrical output signal as a continuous noninferential measurement of actual flow, of claim 7, further comprising:
   a. a ball check valve, located in a piping conduit connected to said conical inlet orifice, for preventing flow out of said throughput transmitter through said inlet orifice.

9. The metering pump throughput transmitter for sensing pulsed liquid flows and delivering an electrical output signal as a continuous noninferential measurement of actual flow, of claim 8, wherein said stem is disposed at its upper extremity so as to limit the vertical travel of said float, at the extreme, to a length no greater than the diameter of the smaller of said two cylindrical portions of said float means.

10. The metering pump throughput transmitter for sensing pulsed liquid flows and delivering an electrical output signal as a continuous noninferential measurement of actual flow, of claim 8, further comprising:
   a. a pin transversely extending through the top of said hollow tubular member;

b. a helical spring surrounding a portion of said hollow tubular member and being compressed said pin and said doughnut shaped case for retaining said case in a predetermined position;

wherein said hollow tubular member has the upper end thereof closed thereby limiting travel of said rod in said tubular member.

11. The metering pump throughput transmitter for sensing pulsed liquid flows and delivering an electrical output signal as a continuous noninferential measurement of actual flow, of claim 10, wherein when said upper, larger cylindrical portion of said float is resting on said cloverleaf-shaped guide, the distance between the upper extremity of said rod and said closed, upper end of said tubular member is no greater than the diameter of said lower, smaller cylindrical portion of said float, thereby limiting the vertical travel of said float, at a maximum, to a distance the same as said diameter of said lower, smaller cylindrical portion of said float.

* * * * *